(12) United States Patent
Ryu et al.

(10) Patent No.: US 8,089,585 B2
(45) Date of Patent: Jan. 3, 2012

(54) OPTICAL FILM, PREPARATION METHOD OF THE SAME, AND LIQUID CRYSTAL DISPLAY COMPRISING THE SAME

(75) Inventors: Su-Young Ryu, Daejeon (KR); Byoung-Kun Jeon, Daejeon (KR); Moon-Soo Park, Daejeon (KR); Sin-Young Kim, Daejeon (KR); Hyuk Yoon, Daejeon (KR); Hyoung-Gu Kang, Chungcheongbuk-do (KR); Sang-Jun Yoon, Seoul (KR)

(73) Assignee: LG Chem, Ltd., Seoul (KR)

( * ) Notice: Subject to any disclaimer, the term of this patent is extended or adjusted under 35 U.S.C. 154(b) by 125 days.

(21) Appl. No.: 12/656,062

(22) Filed: Jan. 14, 2010

(65) Prior Publication Data

US 2010/0182547 A1 Jul. 22, 2010

(30) Foreign Application Priority Data

Jan. 19, 2009 (KR) .................. 10-2009-0004238

(51) Int. Cl.
*G02F 1/1335* (2006.01)
*G02B 1/08* (2006.01)
(52) U.S. Cl. ............................ 349/96; 349/123; 428/1.2
(58) Field of Classification Search .................. None
See application file for complete search history.

(56) References Cited

U.S. PATENT DOCUMENTS

| 7,575,696 | B2 * | 8/2009 | Yoshida et al. | 252/299.01 |
|---|---|---|---|---|
| 2005/0200801 | A1 * | 9/2005 | Watanabe | 349/194 |
| 2005/0285998 | A1 * | 12/2005 | Saita et al. | 349/117 |
| 2006/0203161 | A1 * | 9/2006 | Hisakado et al. | 349/117 |
| 2007/0236631 | A1 * | 10/2007 | Ohtani et al. | 349/96 |
| 2009/0268292 | A1 * | 10/2009 | Nakai | 359/493 |
| 2011/0164213 | A1 * | 7/2011 | Nakanishi et al. | 349/129 |

FOREIGN PATENT DOCUMENTS

JP 2006/215184 * 8/2006

* cited by examiner

*Primary Examiner* — Tina Wong
(74) *Attorney, Agent, or Firm* — McKenna Long & Aldridge LLP

(57) ABSTRACT

The present invention relates to an optical film, a method for manufacturing the same, and a liquid crystal display device including the same. In detail, the optical film according to the present invention includes an acryl-based substrate, a liquid crystal alignment film, and a liquid crystal film, the liquid crystal alignment film can maintain strong adhesion strength between the acryl-based substrate and the liquid crystal alignment film and between the liquid crystal alignment film and the liquid crystal film by further introducing a monomer having a functional group capable of performing crosslinking reaction to the photoreactive polymer.

20 Claims, No Drawings

OPTICAL FILM, PREPARATION METHOD OF THE SAME, AND LIQUID CRYSTAL DISPLAY COMPRISING THE SAME

BACKGROUND OF THE INVENTION

1. Field of the Invention

The present invention relates to an optical film, a method for manufacturing the same, and a liquid crystal display device including the same.

This application claims priority from Korean Patent Application No. 10-2009-0004238 filed on Jan. 19, 2009 in the KIPO, the disclosure of which is incorporated herein by reference in its entirety.

2. Description of the Related Art

In general, an optical film such as a retardation film, a viewing angle compensation film and the like is used for the purpose of lowering a change in color of a liquid crystal display (LCD) device by inserting it between a polarizing plate and a liquid crystal display element, enlarging a viewing angle, and improving brightness. To the optical film that is used for the above purpose, the use of an extended film to which optical anisotropicity is provided by extending a polymer film and optical anisotropicity of a liquid crystal film that is manufactured by coating a polymeric liquid crystal compound on a plastic substrate, drying it, irradiating UV thereonto, and curing it has been proposed. In particular, the liquid crystal film may be divided into a rod-shaped liquid crystal and a disc-shaped liquid crystal according to the shape of liquid crystal molecules, and among them, in the rod-shaped liquid crystal, since there are various alignment shapes such as planar, homeotropic, tilted, splay, cholesteric shapes, it is possible to provide an optical property that cannot be obtained through an extended film. Accordingly, if various liquid crystal alignment properties are provided by directly coating the polymeric liquid crystal compound on the extended film, it is possible to provide a role of an optical compensation film that is difficult to be realized by using only a protection film of a polarizing element of a polarizing plate and an extended film.

The liquid crystal film is generally manufactured by coating an alignment agent such as polyimide or polyvinyl alcohol on a plastic substrate to form an alignment film, rubbing it in a predetermined direction, and coating the polymeric liquid crystal compound again for alignment. However, as described above, in the case of when the alignment film is used, since adhesion strength is insufficient, in a high temperature and high humidity environment, a liquid crystal film may be stripped or shrunken. In addition, in a method using rubbing, static electricity or scratches may be easily generated by friction in the rubbing, and fine dust is unavoidably generated from rubbing clothes and the like.

Therefore, as an effort for solving problems of the rubbing method, a non-contact liquid crystal alignment method has been studied, and in this method, a light alignment method for manufacturing a liquid crystal alignment film using light irradiation has been proposed. At this time, as an optical alignment film material for aligning liquid crystal, there are a material that is obtained by an optical dimerization reaction of a cinnamate group, a quomarine group, a calcone group and the like, a material that is obtained by an optical isomerization reaction of a polymer including an azobenzene group, and a material that is obtained by an optical decomposition reaction of a polyimide polymer, but in general, they have weak thermal stability or optical stability, and contamination may occur by decomposed products.

In addition, in general, in order to manufacture a retardation film using a polymeric liquid crystal compound, a viewing angle compensation film, a brightness improving film and the like, an alignment film is generally formed on a plastic substrate, and even in the case of the alignment film composition manufactured through the above process, there is a limit in kind of usable plastic substrates.

SUMMARY OF THE INVENTION

The present invention has been made to solve the above problems, and it is an object of the present invention to provide an optical film that includes a substrate, a liquid crystal alignment film, and a liquid crystal film, and has excellent adhesive strength between the substrate and the liquid crystal alignment film and between the liquid crystal alignment film and the liquid crystal film, a method for manufacturing the same, and a liquid crystal display device.

In order to accomplish the above object, the present invention provides an optical film that comprises 1) an acryl-based film substrate; 2) a liquid crystal alignment film that is formed on the substrate, and is formed by using a liquid crystal alignment film composition including a) a photoreactive polymer that includes one or more selected from the group consisting of a norbornene-based photoreactive polymer including a cinnamate group, a photoreactive polymer including a unit that is represented by the following Formula 1, and a photoreactive polymer including a unit that is represented by the following Formula 2, b) a polyfunctional monomer that is capable of being crosslinked with the photoreactive polymer, c) a photoinitiator, and d) an organic solvent; and 3) a liquid crystal film that is formed on the liquid crystal alignment film:

[Formula 1]

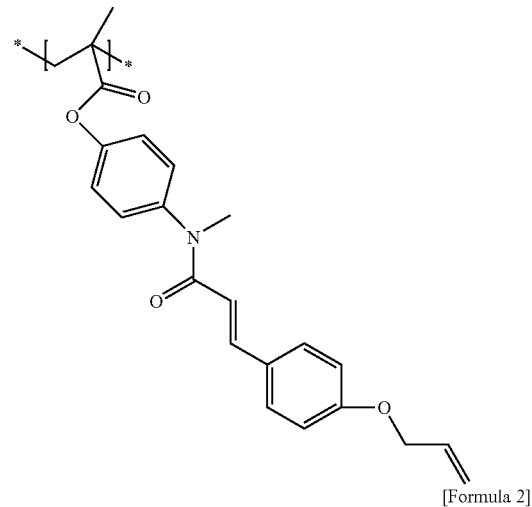

[Formula 2]

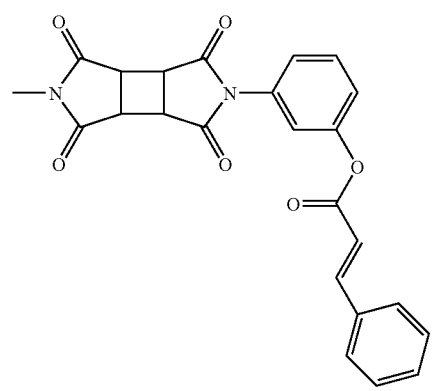

In addition, the present invention provides a method for manufacturing an optical film, which comprises the steps of 1) coating and drying a liquid crystal alignment film composition including a) a photoreactive polymer that includes one or more selected from the group consisting of a norbornene-based photoreactive polymer including a cinnamate group, a photoreactive polymer including a unit that is represented by the following Formula 1, and a photoreactive polymer including a unit that is represented by the following Formula 2, b) a polyfunctional monomer that is capable of being crosslinked with the photoreactive polymer, c) a photoinitiator, and d) an organic solvent on a substrate of an acryl film, and irradiating UV thereto to form a liquid crystal alignment film; and 2) coating and drying a liquid crystal compound solution that includes a polymeric liquid crystal compound, a photoinitiator, and an organic solvent on the liquid crystal alignment film, and irradiating UV thereto.

In addition, the present invention provides a liquid crystal display device that includes the optical film.

Since the optical film according to the present invention has excellent adhesion strength between the substrate and the liquid crystal alignment film and between the liquid crystal alignment film and the liquid crystal film, durability of the optical film may be improved. In addition, even in a high temperature and high humidity environment, problems such as stripping or shrinkage of the liquid crystal film from the liquid crystal alignment film may be solved.

DETAILED DESCRIPTION OF THE PREFERRED EMBODIMENTS

Hereinafter, the present invention will be described in detail.

An optical film according to the present invention comprises 1) an acryl-based film substrate; 2) a liquid crystal alignment film that is formed on the substrate, and is formed by using a liquid crystal alignment film composition including a) a photoreactive polymer that includes one or more selected from the group consisting of a norbornene-based photoreactive polymer including a cinnamate group, a photoreactive polymer including a unit that is represented by the following Formula 1, and a photoreactive polymer including a unit that is represented by the following Formula 2, b) a polyfunctional monomer that is capable of being crosslinked with the photoreactive polymer, c) a photoinitiator, and d) an organic solvent; and 3) a liquid crystal film that is formed on the liquid crystal alignment film.

In the optical film according to the present invention, it is preferable that the photoreactive polymer of 2) the liquid crystal alignment composition has a number average molecular weight in the range of 10,000 to 500,000.

The norbornene-based photoreactive polymer that includes the cinnamate group may include a unit that is represented by the following Formula 3.

[Formula 3]

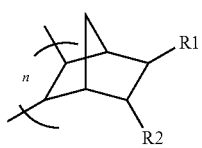

wherein
n is in the range of 50 to 5,000,
at least one of R1 and R2 is represented by the following Formula 4,
the remains are selected from the group consisting of hydrogen, halogen, alkyl group having 1 to 20 carbon atoms, and the group of the following Formula 4,

[Formula 4]

wherein R3 is each independently selected from the group consisting of hydrogen, halogen, alkyl group having 1 to 20 carbon atoms, alkoxy group having 1 to 20 carbon atoms, and allyloxy group.

As the norbornene photoreactive polymer that includes the cinnamate group, any one selected from the group consisting of polynorbornene cinnamate, polynorbornene alkoxycinnamate (alkoxy group has having 1 to 20 carbon atoms), polynorbornene allyloyloxycinnamate, polynorbornene fluorocinnamate, polynorbornene chlorocinnamate and polynorbornene dicinnamate, but it is not limited thereto.

In the optical film according to the present invention, it is more preferable that the norbornene-based photoreactive polymer that includes cinnamate group includes one or more that are selected from the group consisting of units that are represented by Formulas 5 to 10:

[Formula 5]

[Formula 6]

[Formula 7]

[Formula 8]

[Formula 9]

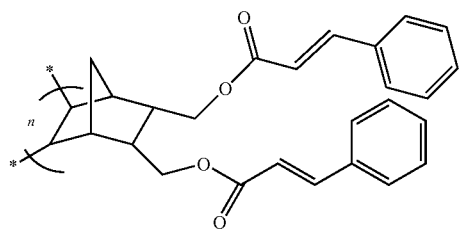

[Formula 10]

wherein n is in the range of 50 to 5,000.

In the case of when any one kind selected from the norbornene photoreactive polymer that includes the cinnamate group according to the present invention, the photoreactive polymer that includes the unit represented by Formula 1, and the photoreactive polymer that includes the unit represented by Formula 2 is used alone, the same or similar effect may be obtained, and in the case of when one or more kinds of them are mixed with each other and used in the liquid crystal alignment film composition, the same or similar effect may be obtained as compared to the case of when the photoreactive polymer is used alone.

The content of the photoreactive polymer is in the range of preferably 0.1 to 20 wt % in the entire liquid crystal alignment film composition, and more preferably 0.1 to 10 wt %. If the content is less than 0.1 wt %, since the thickness of the film is very small, it is impossible to obtain the good alignment film, and in the case of when the content is more than 20 wt %, since the thickness of the film is very large, it is difficult to obtain the good alignment film.

In the optical film according to the present invention, the polyfunctional monomer in 2) the liquid crystal alignment film composition is used in conjunction with the photoreactive polymer and serves to introduce a further crosslinking reaction in addition to the dimerization reaction of the photoreactive polymer when UV is irradiated.

The crosslinking reaction includes a crosslinking reaction in a photoreactive polymer, a crosslinking reaction between a photoreactive polymer and a polyfunctional monomer, and a crosslinking reaction between a photoreactive polymer and a liquid crystal molecule.

If polarized UV is irradiated on the cinnamate group, it is aligned in a direction that is vertical to the polarized UV, but a portion of the entire cinnamate group is reacted and the remains are not reacted. In the present invention, a method for improving adhesion strength between the substrate and the liquid crystal alignment film, and between the liquid crystal alignment film and the liquid crystal film is to use the unreacted cinnamate group. That is, when the photoinitiator and the polyfunctional monomer are added, a crosslinking reaction is introduced between the unreacted cinnamate groups or between the cinnamate group and the polyfunctional monomer, and a crosslinking reaction is introduced in conjunction with the liquid crystal molecules that will be coated on the liquid crystal alignment film.

In the present specification, the "polyfunctional" means including of two or more functional groups.

The functional group serves to perform a crosslinking reaction and a polymerization reaction by radicals, and if it includes a double bond between carbon atoms, its kind is not limited. For example, as the representative functional group, there is an acrylate group, but it is not limited thereto.

It is preferable that the polyfunctional monomer is a polyfunctional monomer that includes a functional group (double bond between carbon atoms) capable of performing a radical reaction selected from the group consisting of the following Structural Formulas.

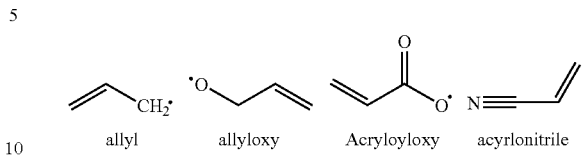

allyl   allyloxy   Acryloyloxy   acryrlonitrile

Detailed examples of the polyfunctional monomer may include one or more of trimethylolpropan triacrylate, pentaerythritol tri(metha)/tetraacrylate, dipentaerythritol hexa/pentaacrylate, triglycerol di(metha)acrylate, tripropylene glycol di(metha)acrylate, tetraethylene glycol di(metha)acrylate, pentaerythritol di(metha)acrylate, 1,6-hexanediol di(metha)acrylate, glycerol di(metha)acrylate, 2-hydroxyethyl(metha)acrylate, 2-hydroxypropyl (metha)acrylate, methoxyethyl(metha)acrylate, N,N-dimethylaminoethyl (methyl)acrylate, butoxytriethylene glycol (metha)acrylate, 2-carboxyethyl acrylate, hydroxypropyl acrylate, mono-2-(acryloyloxy)ethyl succinate, vinyl acrylate, 3-(acryloyloxy)-2-hydroxypropyl (metha)acrylate, glycerol 1,3-diglycerolate diacrylate, tri(propylene glycol) glycerolate diacrylate, allyl (metha)acrylate, diacetone acrylamide, (metha)acrylamide, methyl 2-acetamidoacrylate, N-[tris(hydroxymethyl)methyl]acrylamide, N,N'-(1,2-dihydroxyethylene)bisacrylamide, N,N'-methylenebis(acrylamide), 1,3,5-triacryloylhexahydro-1,3,5-triazine, 2,4,6-triallyloxy-1,3,5-triazine, tris(2,3-epoxypropyl) isocyanurate, tris[2-(acryloyloxy)ethyl]isocyanurate, tetracyanoethylene oxide, triallyl 1,3,5-benzenetricarpboxylate, diacetone acrylamide, N,N'-(1,2-dihydroxyethylene)bisacrylamide, poly(melamine-co-formaldehyde), 2-carboxyethyl acrylate, hydroxypropyl acrylate, mono-2-(acryloyloxy)ethyl succinate, vinyl acrylate, 3-(acryloyloxy)-2-hydroxypropyl (metha)acrylate, 2-(2-oxo-imidazolidinyl)ethyl(metha)acrylate, carprolactone 2-((metha)acryloyloxy)ethyl ester, mono-2-((metha)acryloyloxy)ethyl malate, 1,2,3-triazole-4,5-dicarboxylic acid, 3-allyloxy-1,2-propandiol, bis[4-(glycidyloxy)phenyl]methane, and 2-vinyl-1,3,-dioxalene, but they are not limited thereto.

It is more preferable that the polyfunctional monomer is pentaerythritol triacrylate, dipentaerythritol hexaacrylate or tris[2-(acryloyloxy)ethyl] isocyanurate, but it is not limited thereto.

The content of the polyfunctional monomer is in the range of preferably 0.1 to 20 wt % in the entire liquid crystal alignment film composition, and more preferably 0.1 to 5 wt %. If the content is less than 0.1 wt %, there is no further effect of the crosslinking reaction, and in the case of when the content is more than 20 wt %, since alignment ability is lost, it is not preferable.

In the optical film according to the present invention, in 2) the liquid crystal alignment film composition, any photoinitiator may be used as long as it can induce a radical reaction. For example, as the photoinitiator, there are α-hydroxy ketones, α-amino ketones, phenyl glyoxylate, oxim esters and the like, but it is not limited thereto. In particular, it is preferable that the photoinitiator is oxime esters.

The content of the photoinitiator is in the range of preferably 0.01 to 5 wt % in the entire liquid crystal alignment film composition, and more preferably 0.01 to 2 wt %. If the content is less than 0.01 wt %, there is no further effect of the crosslinking reaction, and in the case of when the content is more than 5 wt %, since alignment ability is largely lowered, it is not preferable.

In the optical film according to the present invention, in 2) the liquid crystal alignment film composition, the organic solvent may be one or more organic solvents that are selected from the group consisting of ethers, aromatics, halogens, olefins, and ketones. In more detail, cyclopentanone, chlorobenzene, N-methylpyrrolidone, toluene, dimethyl sulfoxide, dimethyl formamide, chloroform, gamma-butyrolactone, tetrahydrofurane and the like may be used, but it is not limited thereto.

In the optical film according to the present invention, 3) the liquid crystal film includes a polymeric liquid crystal compound.

The polymeric liquid crystal compound is polymerized with liquid crystal monomers therearound by light, and nematic liquid crystal or cholesteric liquid crystal forming liquid crystal polymer may be used.

In general, the polymeric liquid crystal compound is phase transferred into liquid crystal having nematic regularity or cholesteric regularity by the polymerization reaction in the drying and curing process after the alignment film composition is coated on the plastic substrate or plastic substrate having the alignment property and coated on the fixed alignment film in an isotropic state, and is aligned in a predetermined direction. Accordingly, even when the other layer is layered, the alignment is not changed.

In the optical film according to the present invention, it is preferable that the polymeric liquid crystal compound includes one or more materials having the acrylate group that is capable of being polymerized by photoreaction. As the material having the acrylate group, there are low molecular liquid crystals that have a nematic or cholesteric liquid crystal phase at room temperature or high temperature such as cyano biphenyl acrylate, cyano phenyl cyclohexane acrylate, cyano phenyl ester acrylate, benzoic acid phenyl ester acrylate, phenyl pyrimidine acrylate, a mixture thereof and the like.

In the optical film according to the present invention, 1) the acryl film may include the (metha)acryl resin.

As the (metha)acryl resin, resins that are known in the art may be used, and in particular, homo or copolymer of (metha) acryl monomer; copolymer of (metha)acryl monomer and aromatic vinyl monomer; copolymer of (metha)acryl monomer, aromatic vinyl monomer and acid anhydride; and copolymer of (metha)acryl monomer and cyclic monomer may be used.

As the (metha)acryl monomer, a compound that has a double bond between a carbonyl group of an ester group and conjugated carbons may be used, and a substituent group thereof is not particularly limited. It is understood that the (metha)acryl monomer described in the present specification includes acrylate and an acrylate derivative, and alkyl acrylate, alkyl methacrylate, alkyl butacrylate and the like. For example, an example of the (metha)acryl monomer includes a compound that is represented by the following Formula 11.

[Formula 11]

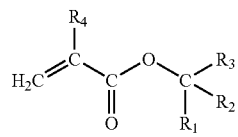

wherein
$R_1$, $R_2$ and $R_3$ are each independently a hydrogen atom, or a monovalent hydrocarbon group that includes or not includes a hetero atom and has 1 to 30 carbon atoms, at least one of $R_1$, $R_2$ and $R_3$ may be an epoxy group; $R_4$ is a hydrogen atom or an alkyl group having 1 to 6 carbon atoms.

In detail, as the (metha)acryl monomer, one or more acryl monomers that are selected from the group consisting of methylacrylate, ethylacrylate, methylmethacrylate, ethylmethacrylate, methylethacrylate, and ethylethacrylate may be used, and in particular, it is most preferable that methylmethacrylate (MMA) is used.

As the aromatic vinyl monomer, it is preferable to use a monomer having a structure in which a benzene nucleus or a vinyl group is substituted or unsubstituted by one or more $C_1$ to $C_5$ alkyl groups or a halogen group. For example, it is preferable to use one or more styrene monomers that are selected from the group consisting of styrene, α-methylstyrene, p-methylstyrene, vinyltoluene and the like.

As the acid anhydride, the carboxylic acid anhydride may be used, monovalent or polyvalent of divalent or more of carboxylic acid anhydride may be used. Preferably, maleic acid anhydride or a derivative thereof may be used, and, for example, the compound of the following Formula 12 may be used.

[Formula 12]

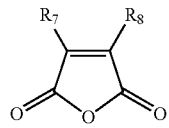

wherein
$R_7$ and $R_8$ are each independently a hydrogen atom or an alkyl group having 1 to 6 carbon atoms.

As the cyclic monomer, maleic anhydride, maleimide, glutalic anhydride, glutalimide, lactone and lactam or a derivative thereof may be used, and a maleimide monomer is more preferable. The maleimide monomer includes N-cyclohexylmaleimide, N-phenylmaleimide, N-methylmaleimide, N-butylmaleimide or a derivative thereof, but is not limited thereto. In particular, N-cyclohexylmaleimide or a derivative thereof is most preferable. In the copolymer of the (metha) acryl monomer and the cyclic monomer, in order to lower a haze value of the film, it is advantageous that the content of the cyclic monomer is in the range of 1 to 50 wt %.

The film that includes the (metha)acryl resin may further include at least one species of aromatic resin having chain and aromatic portion and the chain having a hydroxy group containing portion; styrene resin; and copolymer of styrene monomer and cyclic monomer.

It is preferable that the number average molecular weight of the chain having the hydroxy group containing portion and the aromatic resin having the aromatic portion is in the range of 1,500 to 2,000,000 g/mol. It is preferable that the aromatic resin includes a phenoxy resin. Herein, the phenoxy resin has a structure in which at least an oxygen radical is bonded to a benzene ring. For example, the chain having the hydroxy group containing portion and the aromatic resin having the aromatic portion may include one or more units that are represented by the following Formula 13. The aromatic resin includes 5 to 10,000 units that are represented by the following Formula 13, more preferably 5 to 7,000 units, and more preferably 5 to 5,000 units. In the case of when two or more kinds of units that are represented by the following Formula 13 are included in the aromatic resin, they may be included in a random, alternative, or block form.

[Formula 13]

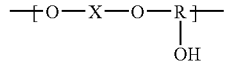

wherein
X is a divalent group that includes at least one benzene ring, and R is a straight-chain or branched-chain alkylene having 1 to 6 carbon atoms.

In detail, it is preferable that X is a divalent group that is derived from the compounds that are represented by the following Formulas 14 to 16, but it is not limited thereto.

[Formula 14]

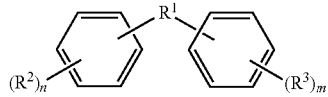

wherein

R¹ is a direct bond, straight-chain or branched-chain alkylene having 1 to 6 carbon atoms, or cycloalkylidene having 3 to 20 carbon atoms, R² and R³ are each independently hydrogen, straight-chain or branched-chain alkyl having 1 to 6 carbon atoms, or straight-chain or branched-chain alkenyl having 2 to 6 carbon atoms, and n and m are each independently an integer in the range of 1 to 5.

[Formula 15]

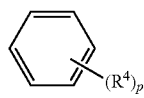

wherein

R⁴ is each independently hydrogen, straight-chain or branched-chain alkyl having 1 to 6 carbon atoms, or straight-chain or branched-chain alkenyl having 2 to 6 carbon atoms, and p is an integer in the range of 1 to 6.

[Formula 16]

wherein

R⁶ and R⁷ are each independently a direct bond, straight-chain or branched-chain alkylene having 1 to 6 carbon atoms, or cycloalkylidene having 3 to 20 carbon atoms, R⁵ and R⁸ are each independently hydrogen, straight-chain or branched-chain alkyl having 1 to 6 carbon atoms, or straight-chain or branched-chain alkenyl having 2 to 6 carbon atoms, and q and r are each independently an integer in the range of 1 to 5.

Detailed examples of the compounds that are represented by Formulas 14 to 16 are shown below, but are not limited thereto.

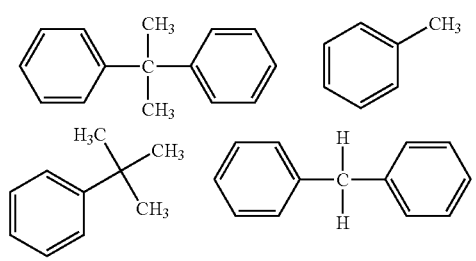

-continued

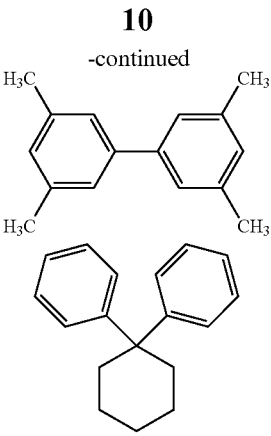

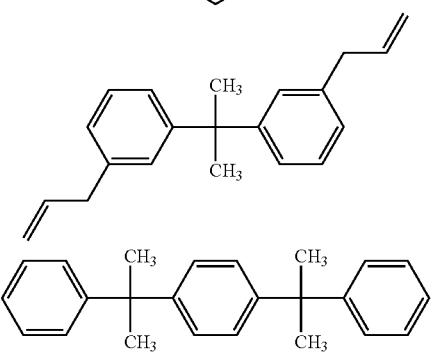

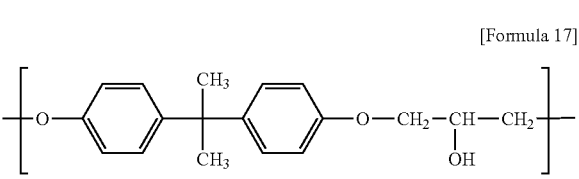

It is most preferable that the aromatic resin includes 5 to 10,000 one or more kinds of phenoxy units that are represented by the following Formula 17.

[Formula 17]

$$\left[ \begin{array}{c} \\ \text{O} \end{array} \begin{array}{c} \text{CH}_3 \\ | \\ \text{C} \\ | \\ \text{CH}_3 \end{array} \begin{array}{c} \\ \end{array} \text{O} - \text{CH}_2 - \underset{\underset{\text{OH}}{|}}{\text{CH}} - \text{CH}_2 \right]$$

The end of the aromatic resin may be an OH group.

In the case of when the film that includes the (metha)acryl resin includes the chain having the hydroxy group containing portion and the aromatic resin having the aromatic portion, the content of the (metha)acryl resin is in the range of preferably about 40 to 99 wt %, more preferably about 70 to 98 wt %, and the content of the aromatic resin is in the range of preferably about 1 to 60 wt % and more preferably about 2 to 30 wt %.

In the case of when the copolymer of the styrene monomer and the cyclic monomer is used, the content of the cyclic monomer of the copolymer is in the range of about 1 to 99 wt %, preferably about 1 to 70 wt %, and more preferably about 5 to 60 wt %.

In the case of when the film that includes the (metha)acryl resin includes the copolymer of the styrene resin or the styrene monomer and the cyclic monomer in conjunction with the chain having a hydroxy group containing portion and the and aromatic resin having the aromatic portion, the content of the (metha)acryl resin is in the range of preferably about 50 to 99 wt % and more preferably about 75 to 98 wt %, the content of the aromatic resin is in the range of preferably about 0.5 to 40 wt % and more preferably about 1 to 30 wt %, and the content of the copolymer of the styrene resin or styrene monomer and the cyclic monomer is in the range of preferably about 0.5 to 30 wt % and more preferably about 1 to 20 wt %.

The optical film according to the present invention may have an optical anisotropicity, and may be used as a retardation film, a polarizing film, and a protective film for liquid crystal display devices.

In addition, a method for manufacturing an optical film according to the present invention includes the steps of 1) coating and drying a liquid crystal alignment film composition including a) a photoreactive polymer that includes one or more selected from the group consisting of a norbornene-based photoreactive polymer including a cinnamate group, a photoreactive polymer including a unit that is represented by the following Formula 1, and a photoreactive polymer including a unit that is represented by the following Formula 2, b) a polyfunctional monomer that is capable of being crosslinked with the photoreactive polymer, c) a photoinitiator, and d) an organic solvent on a substrate of an acryl film, and irradiating UV thereto to form a liquid crystal alignment film; and 2) coating and drying a liquid crystal compound solution that includes a polymeric liquid crystal compound, a photoinitiator, and an organic solvent on the liquid crystal alignment film, and irradiating UV thereto.

In the method for manufacturing the optical film according to the present invention, in the step 1), any method for coating the liquid crystal alignment film composition on the substrate of the acryl extended film may be used as long as it is generally carried out in the art, and it is preferable that it is uniformly coated in a thickness in the range of 800 to 2,000 Å on the substrate of the cycloolefine film.

In the step 1), after the liquid crystal alignment film composition is coated on the substrate of the acryl film, in order to remove the residual solvent, it may be dried at a temperature in the range of 25 to 150° C. for at least 30 sec. In the case of when the drying temperature is less than 25° C., since the drying is not sufficiently performed, stains may be generated or the alignment performance may be lowered by an effect of the residual solvent, and in the case of when the drying temperature is more than 150° C., since the substrate may be deformed, it is not preferable.

After the drying is completed, alignment may be provided in a desired predetermined direction by irradiating UV more than half a second that is linearly polarized in a predetermined direction. Therefore, the photoreactive polymer constituting the liquid crystal alignment film induces the primary molecular alignment in a direction (absorption axis) that is vertical to the permeation axis of the UV polarizing plate (wire grid polarizing plate) through the dimerization (ring addition) reaction by irradiation of UV. Accordingly, in the case of when the polarizing direction of irradiated UV is controlled, the alignment of the alignment film may be controlled in a desired predetermined angle. Thus, it is possible to control the optical axis of the polymeric liquid crystal compound that will be coated on the liquid crystal alignment film in respects to the progress direction of the substrate in a predetermined angle.

In the method for manufacturing the optical film according to the present invention, the liquid crystal compound solution of the step 2) may be manufactured by dissolving the polymeric liquid crystal compound and the photoinitiator in an organic solvent. In the liquid crystal compound solution, the content of the polymeric liquid crystal compound is not particularly limited, but is in the range of preferably 5 to 70 parts by weight and more preferably 5 to 50 parts by weight on the basis of 100 parts by weight of the entire liquid crystal compound solution. If the content of the polymeric liquid crystal compound is less than 5 parts by weight, stains may be seriously generated, and in the case of when the content is more than 70 parts by weight, since an amount of solvent is small, the polymeric liquid crystal compound may be precipitated.

A small amount of photoinitiator is included in the liquid crystal compound solution. The content of the photoinitiator is in the range of preferably 3 to 10 parts by weight on the basis of 100 parts by weight of the polymeric liquid crystal compound in the entire liquid crystal compound solution. If the content of the photoinitiator is less than 3 parts by weight, sufficient curing is not generated when UV is irradiated, and in the case of when the content is more than 10 parts by weight, the liquid crystal alignment may be changed by an effect of photoinitiator.

In addition, in addition to the photoinitiator, a chiral agent, a surfactant, a polymeric monomer, a polymer and the like may be added to the liquid crystal compound solution as long as it does not suppress the liquid crystal alignment.

When the liquid crystal compound solution is manufactured, as the organic solvent, halogenated hydrocarbons such as chloroform, tetrachloroethane, trichloroethylene, tetrachloroethylene, and chlorobenzene; aromatic hydrocarbons such as benzene, toluene, xylene, methoxy benzene, and 1,2-dimethoxybenzene; ketones such as acetone, methylethylketone, cyclohexanone, and cyclopentanone; alcohols such as isopropyl alcohol, and n-butanol; cellosolves such as methyl cellosolve, ethyl cellosolve, and butyl cellosolve, and the like may be used, but it is not limited thereto and it may be used alone or in a mixture form.

After the liquid crystal compound solution is coated on the liquid crystal alignment film, the drying process is carried out, and it is preferable that the drying temperature is in the range of 25 to 120° C. and the drying time is at least 1 min. The drying temperature is an important factor in alignment position pose of the liquid crystal, and in the case of when it deviates from the above temperature range and the time range, it may affect the alignment of the liquid crystal and stains may be generated.

After the drying process is carried out, the liquid crystal layer that is aligned on the liquid crystal alignment film is fixed by polymerizing it through irradiation of UV and curing it. At this time, the curing by the polymerization is carried out under the presence of the photoinitiator that absorbs the wavelength at a UV range. The irradiation of UV may be carried out under the atmosphere or under the nitrogen atmosphere while oxygen is shielded in order to increase reaction efficiency. In general, as the UV irradiating machine, a middle or high pressure mercury UV lamp having the intensity of 80 w/cm or more, or a metal halide lamp may be used. When UV is irradiated, a cold mirror or other cooling device may be installed between the substrate and UV lamp so that the surface temperature of the liquid crystal layer is in the temperature range having the liquid crystal state.

In addition, the present invention provides a liquid crystal display device that includes one or more optical films.

The optical film according to the present invention is used as an optical compensation member for liquid crystal display devices. For example, there are a retardation film such as STN (Super Twist Nematic) LCD, TFT-TN (Thin Film Transistor-Twisted Nematic) LCD, VA (Vertical Alignment) LCD, and IPS (In-Plane Switching) LCD; a ½ wavelength plate; a ¼ wavelength plate; an inverse wavelength dispersion characteristic film; an optical compensation film; a color filter; a laminate film with a polarizing plate; and a polarizing plate compensation film and the like.

A liquid crystal display device that includes one or more optical films will be described in detail below.

In a liquid crystal display device that includes a liquid crystal cell and a first polarizing plate and a second polarizing plate provided on both sides of the liquid crystal cell, the optical film may be provided between the liquid crystal cell and the first polarizing plate and/or the second polarizing plate. That is, one or more optical films may be provided between the first polarizing plate and the liquid crystal cell, between the second polarizing plate and the liquid crystal cell, or between the first polarizing plate and the liquid crystal cell and between the second polarizing plate and the liquid crystal cell.

The first polarizing plate and the second polarizing plate may include a protective film on a side or both sides thereof. As the inner protective film, there may be a triacetate cellulose (TAC) film, a polynorbornene film that is manufactured by using the ring opening metathesis polymerization (ROMP), a HROMP (ring opening metathesis polymerization followed by hydrogenation) polymer that is obtained by hydrogenating again the ring opened cyclic olefine polymer, a polyester film, or a polynorbornene film that is manufactured by using the addition polymerization, and the like. In addition to this, a film that is made of a transparent polymer material may be used as the protective film, but it is not limited thereto.

In addition, the present invention provides an integrated polarizing plate that comprises a polarizing film; and one or more optical films according to the present invention on one side or both sides of the polarizing film as a protective film.

In the case of when the optical film according to the present invention is applied to the protective film in the integrated polarizing plate, a side that is in contact with the polarizing film may be a substrate of the optical film according to the present invention or a liquid crystal film side.

In the case of when the retardation film is provided on only one side of the polarizing film, a protective film that is known in the art may be provided on the other side.

As the polarizing film, a film that includes polyvinylalcohol (PVA) including iodine or dichromatic dye may be used. The polarizing film may be manufactured by dyeing iodine or dichromatic dye on the PVA film, but its manufacturing method is not particularly limited. In the present specification, the polarizing film means a state that does not include the protective film, and the polarizing plate means a state that includes the polarizing film and the protective film.

In the integrated polarizing plate according to the present invention, the protective film and the polarizing film may be laminated by using a method that is known in the art.

For example, the lamination of the protective film and the polarizing film may be carried out by an attachment method using an attaching agent. That is, first, the attaching agent is coated on the surface of the protective film of the polarizing film or the PVA film that is the polarizing film by using roll coater, gravure coater, bar coater, knife coater or capillary coater and the like. Before the attaching agent is completely dried, the protective film and the polarizing film are laminated by heating and pressing them by using the lamination roll or pressing them at normal temperature. In the case of when the hot melt attaching agent is used, the heating pressing roll should be used.

When the protective film and the polarizing plate are laminated, the usable attaching agent may be a one component or two components PVA attaching agent, a polyurethane attaching agent, an epoxy attaching agent, a styrene butadiene rubber (SBR) attaching agent or a hot melt attaching agent or the like, but is not limited thereto. In the polyurethane attaching agent is used, it is preferable to use a polyurethane attaching agent that is manufactured by using an aliphatic isocyanate compound that is not yellowed by light. In the case of when an attaching agent for one component or two component dry laminate or an attaching agent that has relatively low reactivity to isocyanate hydroxyl group is used, a solution adhesion agent that is diluted by an acetate solvent, a ketone solvent, an ether solvent or an aromatic solvent may be used. At this time, it is preferable that the attaching agent is a low viscosity type having the viscosity of 5000 cps or less. The above attaching agent has excellent storage stability, and it is preferable that the light transmittance of them at 400 to 800 nm is 90% or more.

If an adhesion agent has sufficient adhesion strength, it may be used as the adhesion agent. It is preferable that the adhesion agent is sufficiently cured by heat or UV and mechanical strength is improved to the level of the case of attaching agent, and surface attachment strength is large, such that it has adhesion strength so that it is not stripped as long as any one of both films to which the adhesion agent is attached is damaged.

As the detailed examples of the usable adhesion agent, there may be natural rubber having excellent optical transparency, artificial rubber, elastomer, copolymer of vinyl chloride/vinyl acetate, polyvinylalkylether, polyacrylate or deformed polyolefine adhesion agents, and a curable adhesion agent in which a curing agent such as isocyanate is added thereto.

In addition, the present invention provides a liquid crystal display device that includes an integrated polarizing plate.

In the case of when the liquid crystal display device according to the present invention includes the above integrated polarizing plate, one or more optical films according to the present invention may be further provided between the polarizing plate and the liquid crystal cell.

Hereinafter, preferable Examples will be described in order to help understanding of the present invention. However, the following Examples are set forth to illustrate the present invention, but the scope of the present invention is not limited thereto.

EXAMPLE

Example 1

The raw material pellet was manufactured by providing the resin composition in which poly(N-cyclohexylmaleimide-co-methylmethacrylate) resin and the phenoxy resin were uniformly mixed with each other at the weight ratio of 85:15 to the 16Φ extruder in which a portion from the raw material hopper to the extruder was substituted by nitrogen and melting them at 250° C.

PKFE (Mw=60,000, Mn=16,000, Tg=98° C.) that was manufactured by InChemRez®, Co., Ltd. was used as the phenoxy resin, and in the poly(N-cyclohexylmaleimide-co-methylmethacrylate) resin, as a result of the NMR analysis, the content of N-cyclohexylmaleimide was 6.5 wt %.

The obtained raw material pellet was dried under the vacuum, melted by the extruder at 250° C., passed through the coat hanger-type T-die, and passed through the chrome coating casting roll and the drying roll to manufacture the acryl film having the thickness of 40 μm.

Like the following Table 1,5-norbornene-2-methyl-(4-methoxy cinnamate) that was the photoreactive polymer, dipentaerythritol hexaacrylate that was the polyfunctional monomer, and Igacure OXE02 (Switzerland, Ciba-Geigy, Co., Ltd.) that was the photoinitiator were dissolved in cyclopentanone in the concentration of 2 wt %, 2 wt %, and 0.5 wt %, respectively, and the liquid crystal alignment film coating solution was dried on the acryl film, coated in the thickness of 1,000 Å, and dried by hot wind at 70° C. in the drying oven for 2 min to form the liquid crystal alignment film.

In the case of the liquid crystal alignment film, the high pressure mercury lamp having the intensity of 80 w/cm was used as the light source, the wire grid polarizing plate manufactured by Moxtek, Co., Ltd. was installed so that the polarized UV that was vertical to the progress direction of the substrate was emitted, and exposed at the speed of 3 m/min one time to provide the alignment property.

The polymeric liquid crystal compound coating solution that was manufactured by dissolving 25 parts by weight of the solid in which 95 wt % of polymeric liquid crystal compound (Merck) that was capable of performing plane alignment and included cyano biphenyl acrylate, cyano phenyl cyclohexane acrylate, and cyano phenyl ester acrylate and 5 wt % of Igacure 907 (Switzerland, Ciba-Geigy, Co., Ltd.) that was the photoinitiator were mixed with each other in toluene on the basis of 100 parts by weight of the entire solution was dried and coated in a thickness of 1 micron on the liquid crystal alignment film, dried by hot wind at 60° C. in the drying oven for 2 min, and cured by irradiating nonpolarized UV thereto by using the high pressure mercury lamp having the intensity of 80 w/cm to manufacture the liquid crystal film.

Accordingly, finally, it was possible to obtain the optical film in which the acryl film, the liquid crystal alignment film formed on the acryl film, and the liquid crystal film formed on the liquid crystal alignment film were sequentially layered.

TABLE 1

| Item | | | Weight (g) | Weight ratio (%) |
|---|---|---|---|---|
| Alignment film composition solution | Solvent | Cyclopentanone | 980 | 95.6 |
| | Alignment film composition | 5-norbornene-2-methyl-(4-methoxy cinnamaet) | 20 | 1.95 |
| | | Dipentaerythritol hexacrylate | 20 | 1.95 |
| | | Igacure OXE02 | 5 | 0.5 |

Example 2

The liquid crystal film was manufactured by using the same method as Example 1, except that the polymeric liquid crystal compound (Merck) that was capable of performing spread alignment and included cyano biphenyl acrylate, cyano phenyl cyclohexane acrylate, and cyano phenyl ester acrylate was used instead of the polymeric liquid crystal compound (Merck) that was capable of performing plane alignment and included cyano biphenyl acrylate, cyano phenyl cyclohexane acrylate, and cyano phenyl ester acrylate.

Example 3

The liquid crystal film was manufactured by using the same method as Example 1, except that the polymeric liquid crystal compound (Merck) that was capable of performing twisted alignment and included cyano biphenyl acrylate, cyano phenyl cyclohexane acrylate, cyano phenyl ester acrylate, benzoic acid phenyl ester acrylate, and phenyl pyrimidine acrylate was used instead of the polymeric liquid crystal compound (Merck) that was capable of performing plane alignment and included cyano biphenyl acrylate, cyano phenyl cyclohexane acrylate, and cyano phenyl ester acrylate.

Example 4

Like the following Table 2, the liquid crystal film was manufactured by using the same method as Example 1, except that Igacure 907 (Switzerland, Ciba-Geigy, Co., Ltd.) was used as the photoinitiator in the liquid crystal alignment film composition.

TABLE 2

| Item | | | Weight (g) | Weight ratio (%) |
|---|---|---|---|---|
| Alignment film composition solution | Solvent | Cyclopentanone | 980 | 95.6 |
| | Alignment film composition | 5-norbornene-2-methyl-(4-methoxy cinnamaet) | 20 | 1.95 |
| | | Dipentaerythritol hexacrylate | 20 | 1.95 |
| | | Igacure 907 | 5 | 0.5 |

Example 5

The liquid crystal film was manufactured by using the same method as Example 2, except that Igacure 907 (Switzerland, Ciba-Geigy, Co., Ltd.) was used as the photoinitiator in the liquid crystal alignment film composition.

Example 6

The liquid crystal film was manufactured by using the same method as Example 3, except that Igacure 907 (Switzerland, Ciba-Geigy, Co., Ltd.) was used as the photoinitiator in the liquid crystal alignment film composition.

Example 7

The liquid crystal film was manufactured by using the same method as Example 1, except that 5-norbornene-2-methyl-(4-fluoro cinnamate) was used instead of 5-norbornene-2-methyl-(4-methoxy cinnamate) as the photoreactive polymer.

Example 8

The liquid crystal film was manufactured by using the same method as Example 1, except that 5-norbornene-2-methyl-(4-allyloxy cinnamate) (compound that was represented by Formula 6) was used instead of 5-norbornene-2-methyl-(4-methoxy cinnamate) as the photoreactive polymer.

Example 9

The liquid crystal film was manufactured by using the same method as Example 1, except that 5-norbornene-2-methyl-cinnamate (compound that was represented by Formula 5) was used instead of 5-norbornene-2-methyl-(5-methoxy cinnamate) as the photoreactive polymer.

Example 10

The liquid crystal film was manufactured by using the same method as Example 1, except that AX1-FZ1000 manufactured by Japan Catalyst, Co., Ltd. was used as the substrate film.

<Confirmation of Alignment Property and Attachment Property>

The alignment property of the liquid crystal film according to Examples 1 to 6, attachment property between the substrate and the alignment film, and the attachment property between the alignment film and the liquid crystal were evaluated, and the results thereof are shown in the following Table 3. The evaluation of the alignment property was carried out on the basis of the case of when there was no alignment (X), the case of when the alignment was performed with a slight deviation (Δ), and the case of when the alignment was performed without a deviation (○). The attachment property was evaluated on the basis of whether the tape was attached to the liquid crystal film or not when after the surface of the liquid crystal film was cross-cut by using the knife on the basis of the ASTM standard in a checker pattern having an interval of 1 mm, and the cellophane tape was attached thereto and then detached therefrom, and (○) means the case of when the tape was fully attached thereto, and (X) means the case of when the portion between the checker patterns was partially stripped or fully stripped.

TABLE 3

| Classification | | Alignment property | Attachment property | |
|---|---|---|---|---|
| | | | Substrate/ alignment film | alignment film/ liquid crystal film |
| Example | Example 1 | ○ | ○ | ○ |
| | Example 2 | ○ | ○ | ○ |
| | Example 3 | ○ | ○ | ○ |
| | Example 4 | Δ | Δ | Δ |
| | Example 5 | Δ | Δ | Δ |
| | Example 6 | Δ | Δ | Δ |
| | Example 7 | ○ | ○ | ○ |
| | Example 8 | ○ | ○ | ○ |
| | Example 9 | Δ | Δ | Δ |
| | Example 10 | ○ | ○ | ○ |

<Confirmation of the Thermal Stability of the Alignment Film>

The thermal stability of the alignment film was confirmed by leaving the optical alignment films manufactured by Examples 1 to 6 in the dry oven at 100° C. for 48 hours or more, putting the polymeric liquid crystal compound on the alignment film, and checking the alignment property and the attachment property, and the results thereof are described in the following Table 4. The evaluation of the alignment property was carried out on the basis of the case of when there was no alignment (X), the case of when the alignment was performed with a slight deviation (Δ), and the case of when the alignment was performed without a deviation (○). The attachment property was evaluated on the basis of whether the tape was attached to the liquid crystal film or not when after the surface of the liquid crystal film was cross-cut by using the knife on the basis of the ASTM standard in a checker pattern having an interval of 1 mm, and the cellophane tape was attached thereto and then detached therefrom, and (○) means the case of when the tape was fully attached thereto, and (X) means the case of when the portion between the checker patterns was partially stripped or fully stripped. From the following Table 4, it can be seen that there is little difference in alignment strength before and after heat resistance test of the light alignment film.

TABLE 4

| Classification | | Alignment property | Attachment property | |
|---|---|---|---|---|
| | | | Substrate/ alignment film | alignment film/ liquid crystal film |
| Example | Example 1 | ○ | ○ | ○ |
| | Example 2 | ○ | ○ | ○ |

TABLE 4-continued

| Classification | Alignment property | Attachment property | |
|---|---|---|---|
| | | Substrate/ alignment film | alignment film/ liquid crystal film |
| Example 3 | ○ | ○ | ○ |
| Example 4 | Δ | Δ | Δ |
| Example 5 | Δ | Δ | Δ |
| Example 6 | Δ | Δ | Δ |
| Example 7 | ○ | ○ | ○ |
| Example 8 | ○ | ○ | ○ |
| Example 9 | Δ | Δ | Δ |
| Example 10 | ○ | ○ | ○ |

From the above results, it can be seen that the optical film according to the present invention has excellent adhesion strength between the substrate and the liquid crystal alignment film and between the liquid crystal alignment film and the liquid crystal film, and durability of the optical film may be improved. Therefore, even in a high temperature and high humidity environment, problems such as stripping or shrinkage of the liquid crystal film from the liquid crystal alignment film may be solved.

What is claimed is:
1. An optical film comprising:
1) an acryl-based film substrate;
2) a liquid crystal alignment film that is formed on the substrate, and is formed by using a liquid crystal alignment film composition including a) a photoreactive polymer that includes one or more selected from the group consisting of a norbornene-based photoreactive polymer including a cinnamate group, a photoreactive polymer including a unit that is represented by the following Formula 1, and a photoreactive polymer including a unit that is represented by the following Formula 2, b) a polyfunctional monomer that is capable of being crosslinked with the photoreactive polymer, c) a photoinitiator, and d) an organic solvent; and
3) a liquid crystal film that is formed on the liquid crystal alignment film:

[Formula 1]

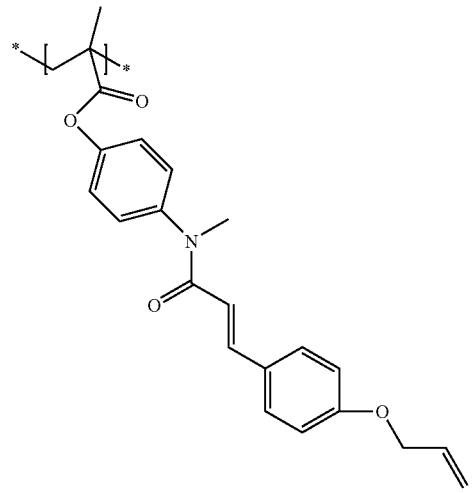

[Formula 2]

2. The optical film as set forth in claim 1, wherein a number average molecular weight of the photoreactive polymer is in the range of 10,000 to 500,000.

3. The optical film as set forth in claim 1, wherein the norbornene-based photoreactive polymer that includes the cinnamate group further includes a unit that is represented by the following Formula 3:

[Formula 3]

wherein
n is in the range of 50 to 5,000,
at least one of R1 and R2 is represented by the following Formula 4,
the remains are selected from the group consisting of hydrogen, halogen, alkyl group having 1 to 20 carbon atoms, and the group of the following Formula 4,

[Formula 4]

wherein R3 is each independently selected from the group consisting of hydrogen, halogen, alkyl group having 1 to 20 carbon atoms, alkoxy group having 1 to 20 carbon atoms, and allyloxy group.

4. The optical film as set forth in claim 1, wherein the norbornene-based photoreactive polymer that includes cinnamate group includes one or more that are selected from the group consisting of polynorbornene cinnamate, polynorbornene alkoxycinnamate (alkoxy group has 1 to 20 carbon atoms), polynorbornene allyloyloxycinnamate, polynorbornene fluorocinnamate, polynorbornene chlorocinnamate and polynorbornene dicinnamate.

5. The optical film as set forth in claim 1, wherein the norbornene-based photoreactive polymer that includes cinnamate group includes one or more that are selected from the group consisting of units that are represented by Formulas 5 to 10:

[Formula 5]

[Formula 6]

[Formula 7]

[Formula 8]

[Formula 9]

[Formula 10]

wherein n is in the range of 50 to 5,000.

6. The optical film as set forth in claim 1, wherein the content of the photoreactive polymer is in the range of 0.1 to 20 wt % in the entire liquid crystal alignment film composition.

7. The optical film as set forth in claim 1, wherein the polyfunctional monomer is a polyfunctional monomer that includes a functional group capable of performing a radical reaction selected from the group consisting of the following Structural Formulas:

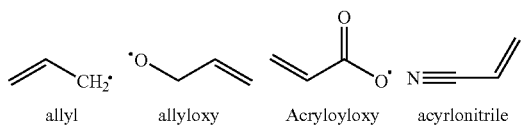

8. The optical film as set forth in claim 1, wherein the polyfunctional monomer includes one or more that are selected from the group consisting of trimethylolpropan triacrylate, pentaerythritol tri(metha)/tetraacrylate, dipentaerythritol hexa/pentaacrylate, triglycerol di(metha)acrylate, tripropylene glycol di(metha)acrylate, tetraethylene glycol di(metha)acrylate, pentaerythritol di(metha)acrylate, 1,6-hexanediol di(metha)acrylate, glycerol di(metha)acrylate, 2-hydroxyethyl(metha)acrylate, 2-hydroxypropyl (metha)acrylate, methoxyethyl(metha)acrylate, N,N-dimethylaminoethyl(methyl)acrylate, butoxytriethylene glycol (metha)acrylate, 2-carboxyethyl acrylate, hydroxypropyl acrylate, mono-2-(acryloyloxy)ethyl succinate, vinyl acrylate, 3-(acryloyloxy)-2-hydroxypropyl(metha)acrylate, glycerol 1,3-diglycerolate diacrylate, tri(propylene glycol) glycerolate diacrylate, allyl (metha)acrylate, diacetone acrylamide, (metha)acrylamide, methyl 2-acetamidoacrylate, N-[tris(hydroxymethyl)methyl]acrylamide, N,N'-(1,2-dihydroxyethylene)bisacrylamide, N,N'-methylenebis(acrylamide), 1,3,5-triacryloylhexahydro-1,3,5-triazine, 2,4,6-triallyloxy-1,3,5-triazine, tris(2,3-epoxypropyl) isocyanurate, tris[2-(acryloyloxy)ethyl]isocyanurate, tetracyanoethylene oxide, triallyl 1,3,5-benzenetricarpboxylate, diacetone acrylamide, N,N'-(1,2-dihydroxyethylene) bisacrylamide, poly(melamine-co-formaldehyde), 2-carboxyethyl acrylate, hydroxypropyl acrylate, mono-2-(acryloyloxy)ethyl succinate, vinyl acrylate, 3-(acryloyloxy)-2-hydroxypropyl(metha)acrylate, 2-(2-oxoimidazolidinyl)ethyl(metha)acrylate, carprolactone 2-((metha)acryloyloxy)ethyl ester, mono-2-((metha)acryloyloxy)ethyl malate, 1,2,3-triazole-4,5-dicarboxylic acid, 3-allyloxy-1,2-propandiol, bis[4-(glycidyloxy)phenyl]methane, and 2-vinyl-1,3,-dioxalene.

9. The optical film as set forth in claim 1, wherein the content of the polyfunctional monomer is in the range of 0.1 to 20 wt % in the entire liquid crystal alignment film composition.

10. The optical film as set forth in claim 1, wherein the photoinitiator is oxime esters.

11. The optical film as set forth in claim 1, wherein the content of the photoinitiator is in the range of 0.01 to 5 wt % in the entire liquid crystal alignment film composition.

12. The optical film as set forth in claim 1, wherein the content of the organic solvent includes one or more that are selected from the group consisting of ethers, aromatics, halogens, olefins, and ketones.

13. The optical film as set forth in claim 1, wherein the liquid crystal film includes a polymeric liquid crystal compound of nematic liquid crystal or cholesteric liquid crystal.

14. The optical film as set forth in claim 1, wherein the liquid crystal film includes a polymeric liquid crystal compound that is selected from the group consisting of cyano biphenyl acrylate, cyano phenyl cyclohexane acrylate, cyano phenyl ester acrylate, benzoic acid phenyl ester acrylate, phenyl pyrimidine acrylate, and a mixture thereof.

15. The optical film as set forth in claim 1, wherein the acryl film includes a (metha)acryl resin.

16. The optical film as set forth in claim 15, wherein the (metha)acryl resin includes one or more that are selected from the group consisting of homo or copolymer of (metha)acryl monomer; copolymer of (metha)acryl monomer and aromatic vinyl monomer; copolymer of (metha)acryl monomer, aromatic vinyl monomer and acid anhydride; and copolymer of (metha)acryl monomer and cyclic monomer.

17. The optical film as set forth in claim 15, wherein the acryl film further includes one or more that are selected from the group consisting of aromatic resin having chain and aromatic portion and the chain having a hydroxy group containing portion; styrene resin; and copolymer of styrene monomer and cyclic monomer.

18. A liquid crystal display device comprising one or more optical films according to claim 1.

19. An integrated polarizing plate comprising: a polarizing film; and one or more optical films according to claim 1 on one side or both sides of the polarizing film as a protective film.

20. A liquid crystal display device comprising the integrated polarizing plate according to claim 19.

* * * * *